United States Patent [19]

Fisher, III et al.

[11] 4,372,610
[45] Feb. 8, 1983

[54] SILENT SEAT BACK RECLINER MECHANISM

[75] Inventors: Alfred J. Fisher, III, Grosse Pointe Farms; Robert L. Bell, Oxford, both of Mich.

[73] Assignee: Fisher Corporation, Troy, Mich.

[21] Appl. No.: 190,583

[22] Filed: Sep. 25, 1980

[51] Int. Cl.³ .............................................. A47C 1/025
[52] U.S. Cl. .................................. 297/367; 297/375; 297/379
[58] Field of Search ....................... 297/375, 366–372; 188/67; 74/576, 541

[56] References Cited
U.S. PATENT DOCUMENTS

| | | |
|---|---|---|
| 535,999 | 3/1895 | Sargent ............................... 297/375 |
| 2,986,046 | 5/1961 | Vigmostad ......................... 74/576 X |
| 4,243,264 | 1/1981 | Bell ...................................... 297/367 |
| 4,279,442 | 7/1981 | Bell ...................................... 297/367 |

*Primary Examiner*—William E. Lyddane
*Attorney, Agent, or Firm*—Harness, Dickey & Pierce

[57] ABSTRACT

The disclosure relates generally to latch mechanisms for controlling reclining movement of a vehicle seat back and more particularly to a seat back latch that precludes audible "ratcheting" of the latch thereof. A spring loaded pawl is engageable with an articulated slidable arm to latch the seat at a desired reclining position. The pawl is pivoted so as to bias the arm away from the teeth thereon due to an angular relationship between the pawl and arm when the arm is released for movement.

4 Claims, 3 Drawing Figures

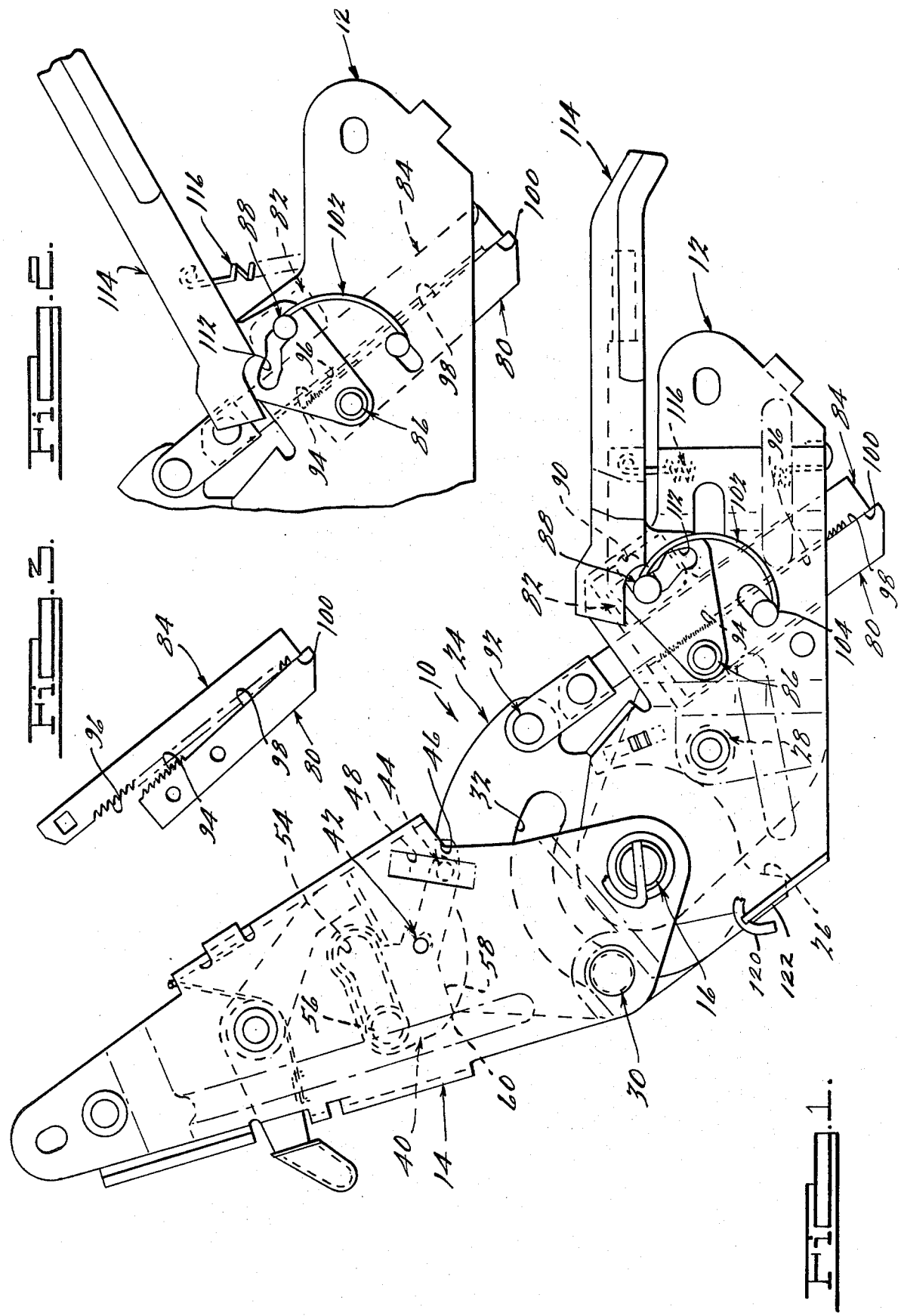

SILENT SEAT BACK RECLINER MECHANISM

BACKGROUND OF THE INVENTION

Manually operated latch mechanisms for the reclinable back of a vehicle seat are now widely accepted in the automobile marketplace. However, current latch mechanisms that satisfy the requirements of positive action, accessibility, light weight, and inexpensive construction, generally utilize interlocking teeth on a pair of relatively movable elements. Thus, in certain conditions, the teeth may "ratchet" over one another resulting in an audible and undesirable sound.

SUMMARY OF THE INVENTION

A latch mechanism for a vehicle seat in accordance with the instant invention comprises a seat cushion bracket that is attached to the seat cushion of a vehicle seat. A seat back bracket is attached to the seat back of the seat and is joined and supported for rotation relative to the seat cushion bracket by a pivot pin. A quadrant is supported by the pivot pin for rotation relative to both the seat cushion bracket and the seat back bracket. A slidable arm having teeth on one side thereof is pivotally connected to the quadrant at a point radially spaced from the pivot pin thereof so as to be articulated relative thereto as well as to be reciprocable relative to a pawl and an arm clamp mounted on the seat cushion bracket. The pawl has teeth that are engageable with the teeth on the arm for controlling its position and therefore the angular position of the seat back. The arm clamp is under the control of a manual operator for positioning the arm. A spring effects rotary movement of the pawl toward the arm in a manner that effects angular displacement of the arm relative to the pawl thereby to disengage the teeth thereon from the teeth on the arm and free the arm for movement relative to the pawl yet effect silent sliding engagement therebetween.

BRIEF DESCRIPTION OF THE DRAWINGS

FIG. 1 is a side elevational view of the latch mechanism of the instant invention;

FIG. 2 is a view similar to FIG. 1 showing the pawl, arm, and arm clamp in the unlatched condition;

FIG. 3 is an exploded view of the arm and pawl.

DETAILED DESCRIPTION OF THE PREFERRED EMBODIMENT

Referring to the drawing, FIG. 1 shows a latch mechanism 10 for a vehicle in accordance with the present invention. Upholstery, the seat cushion, and the seat back have been deleted and only the structural components necessary to an understanding of the invention have been illustrated.

The latch mechanism comprises a seat cushion bracket 12 which is secured to the frame of a vehicle, not shown, for the support of a seat back bracket 14 as by a pin 16 so as to permit the seat back 14 to be folded forwardly and rearwardly relative to the seat cushion bracket 12 to provide access to the rear seat of the associated vehicle as well as to provide for movement of the seat back to a desired reclining position. In addition, the latch mechanism 10 prevents undesired forward pivotal movement of the seat back bracket 14 due to sudden vehicle decelerations, as will be described.

As seen in FIG. 1, a quadrant 24 is journaled on the pin 16. The quadrant 24 controls rotation of the seat back bracket 14, counterclockwise or reclining rotation thereof relative to the seat cushion bracket 12 being stopped after a predetermined angular displacement by engagement of a stop 26 on the quadrant 24 with a pin 28 on the seat cushion bracket 12. Counterclockwise rotation of the seat back bracket 14 relative to the quadrant 24 is stopped by engagement of a pin 30 on the seat back bracket 14 with the end of a slot 32 in the quadrant 24.

An inertia member cage 40 is supported for rotation relative to the seat back bracket 14 by a pivot pin 42. The inertia member cage 40 carries a transversely extending latch pin 44 that cooperates with a shoulder 46 on the quadrant 24 and the edges of a slot 48 in the seat back bracket 14 to limit forward rotation of the seat back bracket 14 upon the occurrence of sudden deceleration of the vehicle. The inertia member cage 40 is formed with an internal track 54 for the acceptance of a generally disc-shaped inertia member 56 which is rollable therealong. When the latch mechanism 10 is in its normal or latched and upright condition, as shown in FIG. 1, the inertia member 56 is positioned to the left of the pivot pin 42 that supports the cage 40 in which position the weight of the inertia member 56 causes the inertia member cage 40 to be biased counterclockwise. However, counterclockwise rotation of the inertia member cage 40 is limited by engagement of a shoulder 58 thereon with an abutment 60 on the quadrant 24 thereby normally maintaining the pin 44 in arcuate alignment with the shoulder 46 on the clutch quadrant 24 so as to be engageable therewith.

Upon the occurrence of sudden vehicle deceleration, the inertia member 56 rolls along the track 54 effecting a clockwise bias on the inertia member cage 40 thereby holding the pin 44 at the lower end of the slot 48 so that it is maintained in a position to engage the shoulder 46 on the quadrant 24. Thus, forward pivotal movement of the seat back bracket 14 relative to the quadrant 24 and the seat cushion bracket 12 is precluded assuming the quadrant 24 is latched relative to the seat bracket 12.

The inertia member cage 40 is positively held in the aforesaid latched position by the inertia member 56 until deceleration ceases whereupon the inertia member 56 returns to the position shown in FIG. 1. While the bias on the inertia member cage 40 reverses when the seat back bracket 14 moves to its normal position shown in FIG. 1, the pin 44 on the inertia member cage 40 is maintained in the locked position shown in FIG. 1, due to engagement of the boss 58 thereon with the abutment 60 on the clutch quadrant 24. Thus, the seat back bracket 14 is normally maintained in the latched condition.

When the vehicle is in the static condition and it is desired to move the seat back bracket 14 forward relative to the seat bracket 12, thereby to faciliate access to the rear seat of the vehicle, the first increment of clockwise rotation of the seat back 14 permits the inertia member cage 40 to rotate counterclockwise under the counterclockwise bias of the inertia member 56. When the cage 40 rotates counterclockwise, the pin 44 is raised within the slot 48 in the bracket 14 so as to clear the shoulder 46 on the quadrant 24 permitting the seat back 14 to be pivoted forwardly until the pin 30 reaches the end of the slot 32 in the quadrant 24. Thus, the pin 44 is automatically moved out of the normal or latched condition to accommodate forward movement of the seat back bracket 14 when no deceleration forces are operative on the vehicle.

In accordance with the instant invention, latching of the seat back bracket 14 at a desired reclining position intermediate the end positions thereof, is achieved by latching of the quadrant 24 relative to the seat cushion bracket 12 due to engagement of a pawl 80 and arm clamp 82 with a reciprocable articulated arm 84. The pawl 80 and arm clamp 82 are supported by the seat cushion bracket 12 on pins 86 and 88, respectively, the pin 86 being fixedly journaled in the seat bracket 12 and the pin 88 being slidable in a slot 90 in the seat bracket 12. The arm 84 is pivotally secured to the quadrant 24 by a pin 92.

The pawl 80 and arm 84 have toothed portions 94 and 96, respectively, which engage one another in complimentary meshing engagement.

It is to be noted that the teeth 94 on the pawl 80 extend for approximately one-third the length thereof, the remainder portion having a smooth surface 98 for silent sliding acceptance and engagement of an untoothed end portion 100 of the arm 84 as will be described.

The pawl 80 and arm clamp 82 are biased toward one another and towards the arm 84 by a U-shaped spring 102, which extends between a pin 104 on the pawl 80 and the pin 88 on the arm clamp 82 which results in "float" of the arm 84 therebetween, as will be described.

In the normal locked condition the movable pin 88 on the arm clamp 82 is moved toward the pin 86 by interaction of the walls of a slot 112 in a manual operator 114 with the pin 88. The manual operator 114 is normally biased clockwise toward the locked condition by a spring 116.

To effect unlocking of the seat back bracket 14 and reclining movement thereof, the manual operator 114 is rotated upwardly about the pin 86 thereby carrying the pin 88 upwardly in the slot 90 in the seat bracket 12 due to interaction of the sidewalls of slot 112 in the manual operator 114 with the pin 88. Movement of the pin 88 upwardly frees the arm clamp 82 from clamping engagement with the arm 84 allowing the arm 84 to pivot about the pin 92 under the bias of the lower end of the pawl 80 on the smooth end 100 of the arm 84, noting that the spring 102 tends to rotate the pawl 80 counterclockwise, as seen in FIGS. 1 and 2, about the pin 86. The angular relationship between the pawl 80 and arm 84 effects disengagement of the teeth 94 on the pawl 80 from the teeth 96 on the arm 84, whereupon the arm 84 "floats" between the pawl 80 and arm clamp 82. Since, in this condition, the tooth free end 100 of arm 84 is in engagement with the tooth free portion 98 of the pawl 80, the arm 84 can reciprocate relative to the pawl 80 without audible "ratcheting".

Latching of the seat back bracket 14 at a desired reclining position is achieved by merely releasing the handle 114 which moves clockwise about the pin 86 under the bias of the spring 116. As the pin 88 moves within the slot 112 it is biased toward the pin 86, thereby carrying the arm clamp 82 toward the arm 84. The arm 84, in turn, is biased clockwise about its mounting pin 92 until the teeth 96 thereon engage the teeth 94 on the pawl 80.

Return movement of the seat back 14 is initiated in a similar manner by an upward movement of the manual operator 114 releasing the pawl 80 and arm 84. Return movement of the seat back bracket 14 is effected by the bias of a spirally wound spring 120 which extends between a flange 122 on the seat bracket 12 and the pin 16 on the quadrant 24. The pin 16 and quadrant 24 rotate the seat back bracket 14 clockwise due to engagement of the end of the slot 32 in the quadrant 24 with the pin 30 on the seat back bracket 14.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. A latch mechanism for controlling rotation of a vehicle seat back to a reclining position relative to a vehicle seat, said mechanism comprising
    a seat bracket attachable to said vehicle seat,
    a seat back bracket,
    a seat back bracket pivot pin joining said seat bracket and seat back brackets for relative rotation,
    a quadrant supported by said seat back bracket pivot pin for rotation relative to both seat bracket and seat back bracket,
    stop means for said quadrant for limiting rotation of said seat back bracket relative to said quadrant,
    an arm pivot pin on said quadrant radially spaced from said seat back bracket pivot pin,
    an arm rotatably secured on said arm pivot pin and extending between the arm pivot pin on said quadrant and said seat bracket for controlling the rotative position of said quadrant relative to said seat bracket, said arm having teeth on one side thereof,
    a pawl support pin on said seat bracket,
    a pawl rotatably secured on said pawl support pin having a toothed portion engageable with the teeth on said arm,
    an arm clamp engageable with said arm on the opposite side thereof from the teeth thereon, and,
    a manual operator movable between a locked and an unlocked condition, movement of said manual operator from the locked to the unlocked condition effecting movement of said arm clamp relative to both said pawl and said arm whereby said arm is unlocked for movement relative to said pawl, movement of said arm clamp conditioning said arm and pawl for rotation about said arm pivot pin and said pawl support pin respectively thereby to change the angular relationship between said arm and pawl to disengage the teeth thereon whereby said seat back bracket is positionable at a desired rotational position relative to said seat bracket.

2. A latch mechanism in accordance with claim 1 including spring means extending between said pawl and said arm clamp for constantly biasing said pawl against said arm.

3. A latch mechanism in accordance with claim 1 wherein the said pawl has a smooth portion engageable with said arm upon the change in angular relationship therebetween.

4. A latch mechanism for controlling rotation of a vehicle seat back to a reclining position relative to a vehicle seat, said mechanism comprising
    a seat bracket attachable to said vehicle seat,
    a seat back bracket,
    a seat back bracket pivot pin joining said seat bracket and seat back brackets for relative rotation,
    a quadrant supported by said seat back bracket pivot pin for rotation relative to both seat bracket and seat back bracket,
    stop means on said quadrant for limiting rotation of said seat back bracket relative to said quadrant, an arm pivot pin on said quadrant radially spaced from said seat back bracket pivot pin, an arm rotatably secured on said arm pivot pin and extending between said quadrant and said seat bracket for controlling the rotative position of said quadrant relative to said seat bracket, said arm having teeth on one side thereof, a pawl support pin on said seat bracket, a pawl rotatably secured on said pawl support pin rotatable relative to said seat bracket, said pawl having a toothed portion engageable with the teeth on said arm and a smooth portion spaced radially outwardly relative to said pawl support pin from the teeth on said pawl, an arm clamp pin journaled in said seat bracket for lateral movement relative thereto, an arm clamp on said arm clamp pin engageable with said arm on the opposite side thereof from the teeth thereon, a manual operator pivoted on said pawl support pin and movable between a locked and an unlocked condition, movement of said manual operator from the locked to the unlocked condition effecting movement of said arm clamp pin and arm clamp relative to both said pawl and said arm whereby said arm is unlocked for movement relative to said pawl, and spring means biasing said pawl and arm clamp toward one another and toward said arm upon unlocking movement of said manual operator, rotation of said pawl about said pawl support pin effecting rotation of said arm about said arm pivot pin thereby to change the angular relationship between said pawl and said arm and disengage the teeth thereon to enable said arm to move relative to said pawl and said quadrant to move relative seat bracket whereby said seat back bracket is positioned at a desired rotational position relative to said seat bracket.

* * * * *